Jan. 12, 1965    J. ENSINK ETAL    3,165,684
STEPPING MOTOR WITH BISTABLE TRIGGERING
Filed July 3, 1961    2 Sheets-Sheet 1

INVENTOR
JOHANNES ENSINK.
HENDRIKUS C.VAN ROSSUM.
BY HANS VAN KAMPEN
AGENT 3,165,684
STEPPING MOTOR WITH BISTABLE TRIGGERING
Johannes Ensink, Hendrikus Cornelis van Rossum, and Hans van Kampen, all of Hilversum, Netherlands, assignors to North American Philips Company, Inc., New York, N.Y., a corporation of Delaware
Filed July 3, 1961, Ser. No. 121,715
Claims priority, application Netherlands July 26, 1960
13 Claims. (Cl. 318—138)

The invention relates to a device for operating a synchronous motor having a plurality of energizing windings, each of which are adapted to be supplied by relatively phase-shifted energizing alternating voltages, and including a start-stop switch which controls the period of time during which said alternating voltages are to be applied to said energizing windings. The device according to the invention may be used advantageously, for example, for tape drives in telegraphy apparatus, in electronic computers, servo-systems and the like.

The invention has for its object to provide a device of the kind set forth in which the angular displacement of the motor shaft is accurately fixed at a given value when the start-stop switch is actuated. The device is also distinguished by its flexibility in use.

The device according to the invention is characterized in that the phase-shifted energizing alternating voltages are obtained from the output circuits of a plurality of bistable trigger circuits each of which includes a control-circuit controlled by a common control voltage generator. Control pulses produced by said generator are applied to the control circuits of each of said trigger circuits via a gate circuit controlled by the output voltage of another trigger circuit. The control pulses switch the various trigger circuits in order of succession from one stable state to the other stable state. The start-stop switch included in the circuit of the control-voltage generator governs the time period during which the control-pulses are produced.

The invention and its advantages will now be described more fully with reference to the drawings in which.

FIGURE 1 shows a developed view of the stator and the rotor poles of the synchronous motor employed. The self-starting synchronous motor comprises a double multipolar stator 1, 2, in which the stators are relatively offset by an angle of 90°, and a multipolar rotor 3 of permanent magnetic material located between the stators. In this figure the stator 1, 2 and the rotor 3 are shown in developed views. The stator 1, 2 and the rotor 3, may, for example, each comprise eight poles.

Figure 1A:
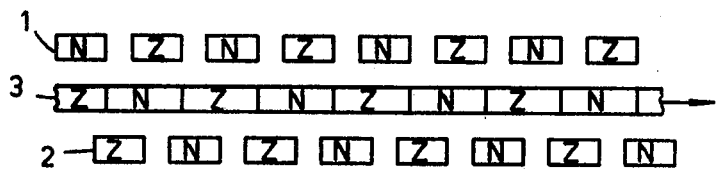
FIGURES 1a to 1d show the stator and the rotor of the synchronous motor employed with the invention in four different positions of the rotor corresponding to different energizing states of the stator poles.
Figure 1B:
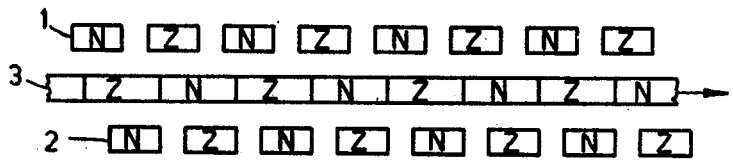
Figure 1C:
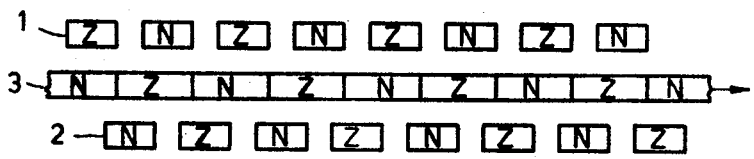
Figure 1D:
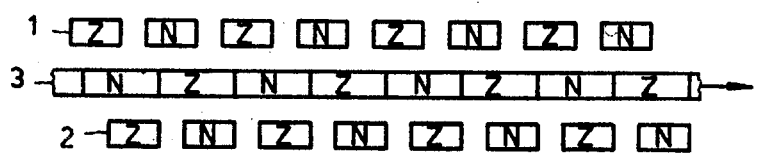
Figure 2:
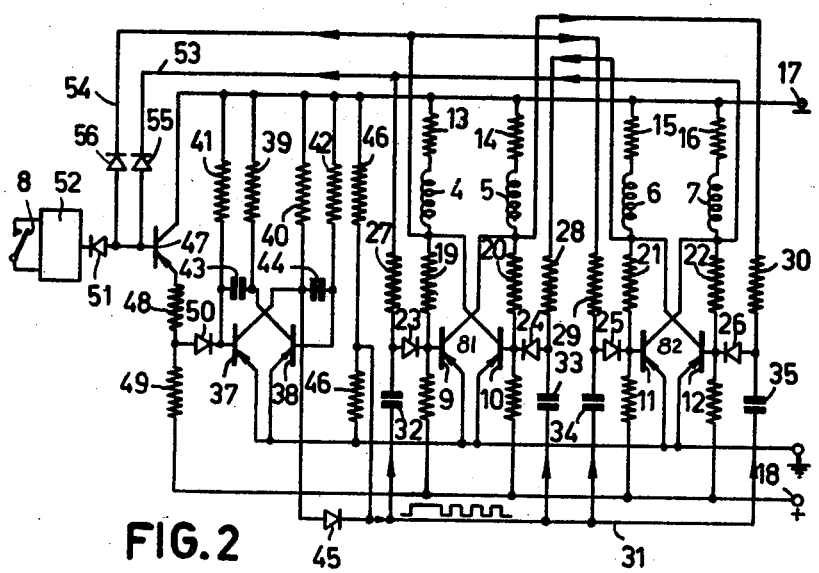
FIGURE 2 shows a device according to the invention and FIGURE 3 shows a variant of the device shown in FIGURE 2.

The poles of the stator 1 are energized by energizing windings 4, 5 of FIGURE 2 and the poles of the stator 2 by energizing windings 6, 7. These windings are energized by relatively phase-shifted energizing alternating voltages as will be described more fully hereafter with respect to FIG. 2. Each of the stator poles of stator 1 in FIG. 1 can be wound with sections of each of the windings 4 and 5 of FIG. 2. Similarly, each of the stator poles of stator 2 can be wound with sections of each of the field windings 6 and 7 of FIG. 2. Another alternative construction provides that sections of the windings 4 and 5 can be wound on alternate stator poles of stator 1, and sections of windings 6 and 7 can be wound on alternate stator poles of stator 2. However, in a preferred embodiment of the invention, the windings 4 and 5 are mounted on a common core which includes all of the stator poles of stator 1, and windings 6 and 7 are mounted on a second core which includes all of the stator poles of stator 2. Alternate poles of each stator are formed by the teeth of first and second pole pieces arranged at either end of each of the stator cores. The details of this arrangement are shown in a copending U.S. application, Serial No. 125,810, filed July 21, 1961. FIGURES 1a to 1d show, by way of example, at four successive instants, the magnetization of the stator poles. The north and south poles are indicated by N and Z respectively. The permanent magnet rotor 3 will thus be stepped along as indicated in the FIGURES 1a-1d by the arrow. Each movement of the rotor 3 is started or stopped by means of a start-stop switch 8 (FIG. 2), which controls the energizing alternating voltages supplied to windings 4, 5 and 6, 7. In the device shown in FIGURE 2, the synchronous motor drives, for example, the writing tape of a telegraphy apparatus. The writing tape is moved through a distance of one character each time the start-stop switch 8 is actuated.

In the device of FIG. 2, whenever the start-stop switch 8 is actuated, the angular displacement of the motor shaft should be fixed in given positions. In order to achieve this operation, the phase-shifted energizing alternating voltages are derived from the output circuits of two bistable trigger circuits 81 and 82, each of which comprises two transistors 9, 10 and 11, 12 respectively. The transistors are cross coupled to each other by means of feedback circuits connected between the collector electrodes and the base electrodes. The collector electrodes of the transistors 9, 10 and 11, 12 are connected via the series combination of one of the energizing windings 4, 5 and 6, 7 respectively, of the synchronous motor and a series resistor 13, 14 and 15, 16 respectively to the negative terminal 17 of a supply voltage source. The collector electrodes of transistors 9, 10 and 11, 12 are also connected via a voltage divider 19, 20 and 21, 22 respectively to the positive terminal 18 of the supply voltage source and to the base electrode of the other transistor of the trigger circuit concerned by means of taps on the respective voltage dividers.

Each of the trigger circuits 81 and 82 comprising transistors 9, 10 and 11, 12 further includes a control circuit connected to the base electrode circuit of each of the transistors. Each of the control-circuits associated with the transistors 9, 10 and 11, 12 are supplied with control-pulses produced by a control-voltage generator (to be described hereinafter), via a gate circuit controlled by the output voltage of the other transistor 11, 12 and 9, 10 respectively. These control-pulses switch the two trigger circuits 81 and 82 from one stable state to the other stable state. The start-stop switch 8 included in the circuit of the control-voltage generator controls the presence or the absence of the control-pulses. In the embodiment shown in FIG. 2 the gate circuits connected to the base electrodes of the transistors 9, 10 and 11, 12 each include a rectifier 23, 24, 25, 26 respectively, which are connected individually via a series resistor 27, 28, 29, 30 respectively to the collector-electrodes of the transistors associated with the other trigger circuit. The control-pulses are supplied to the different gate circuits via a control-voltage conductor 31 to which are connected coupling capacitors 32, 33, 34, 35. As will be described more fully hereinafter, one of the bistable triggers 81 or 82 will switch from one stable state to the other at each occurrence of a positive control-pulse on the control-voltage conductor 31. The rotor 3 of the synchronous motor responds to the control pulses and steps in the direction of the arrow in FIG. 1 through a distance of one rotor pole. It is therefore seen that the direction of rotation and the angular rotation are accurately determined.

It is assumed that in the initial state of the triggers 81 and 82 the transistors 9 and 12 are cut off and the transistors 10 and 11 are conductive. The stator windings 4, 7 are then traversed via the conductive transistors 10, 11 by a comparatively high energizing current whereas substantially no energizing current will flow through the energizing windings 5, 6. The stator poles of the synchronous motor may thus be magnetized in the manner illustrated in FIGURE 1a. In this state a negative voltage occurs at the collector electrodes of the cut-off transistors 9, 12 and the collector electrodes of the conductive transistors 10 and 11 are substantially at earth potential. These collector voltages cause the gate circuits 24, 26 to be cut off and the gate circuits 23, 25 to be open.

If in this state a positive control-pulse appears on control-voltage conductor 31, this positive control-pulse, which is fed via the open gate circuit 25 to the base electrode of the conductive transistor 11, will cause the trigger circuit 82 to change states. This control-pulse does not affect the other transistors 9, 10, 12 of the trigger circuits, since the gate circuits 24, 26, connected to the base electrodes of the transistors 10, 12 are cut off and the transistor 9 is already blocked. Consequently, the gate circuits 23, 26 are cut off and the gate circuits 24, 25 are opened.

As a result of the occurrence of the positive control-pulse, the energizing windings 4, 6 are traversed by a comparatively high energizing current and the energizing windings 4, 7 are substantially not traversed by an energizing current. Therefore, the stator poles are now magnetized as shown in FIGURE 1b and the rotor 3 is caused to move in the direction of the arrow over a distance of one rotor pole.

At a further positive control-pulse the trigger 81 changes over, so that the transistors 9, 12 and the gate circuits 24, 25 are released and the transistors 10, 11 as well as the gate circuits 23, 25 are cut off. The magnetization of the stator poles is then as is shown in FIGURE 1c, the rotor moving again in the direction of the arrow over the distance of one rotor pole.

If a third control-pulse occurs, the transistors 9, 11 and the gate circuits 23, 26 are released and transistors 10, 12 are blocked, so that a magnetization of the stator poles is obtained as is shown in FIGURE 1d, the rotor again moving over the distance of one rotor pole.

A fourth control-pulse results in that the two triggers 81 and 82 respectively return to the initial state so that the magnetization of the stator poles is again as is illustrated in FIGURE 1a. If further control-pulses occur, the aforesaid cycle is repeated and the rotor of the synchronous motor will move, at each occurrence of a control-pulse, 1 over the distance of one rotor pole. This mode of operation corresponds to a fixed angular rotation of the motor shaft, which rotation may be enlarged or diminished, if desired, by means of a transmission mechanism. When the control-pulses fail to occur, the rotor 3 of the synchronous motor is locked in its last position by the then occurring magnetization of the stator poles. At the renewed occurrence of control-pulses it again moves over the distance of one rotor pole at the occurrence of each pulse.

In the embodiment shown the control-voltage generator comprises an astable relaxation generator having two transistors 37, 38, which periodically block each other. Each of the collector electrodes is connected to the base electrode of the other transistors 38, 37 via a relaxation circuit formed by two resistors 39, 41 and 40, 42 respectively, connected to the negative voltage terminal and via an intermediate capacitor 43, 44 respectively. The collector electrode of the transistor 37 is also connected to the control-voltage conductor 31 via a rectifier 45, connected as a limiter. The limiting voltage of the rectifier 45 is derived from a voltage divider 46, connected between earth and the negative voltage terminal 17 of the supply voltage source.

In the normal operational state the astable relaxation generator 37, 38 is inoperative due to a positive bias voltage applied to the base electrode of the transistor 37 and originating from the series combination of two resistors 48, 49 included in the emitter circuit of a normally blocked transistor 47. One end of resistor 49 is connected to the positive voltage terminal 18 of the supply voltage source, whilst the junction of these series resistors 48, 49 is connected to the base electrode of the transistor 37 via a series-connected rectifier 50. When the start-stop switch 8 is actuated, the transistor 47 is released by means of a negative voltage applied to its base electrode. This may, for example, be achieved by using a monostable relaxation generator 52 (shown as a block in the figure), which, when the switch 8 is operated, furnishes a negative pulse to the base electrode of the transistor 47.

As stated above, the transistor 47 is blocked under normal operational conditions so that a positive voltage is applied to the base electrode of the transistor 37 via the series-connected rectifier 50 which causes transistor 37 of the astable relaxation generator 37, 38 to be blocked and the transistor 38 thereof to be conductive. Under these conditions, the limiter 45 connected to the collector electrode of the transistor 37 transmits no voltage to the control-voltage conductor 31. The bistable triggers 81 and 82 are thus fixed in their last-occupied state, which may correspond, for example, with the state of the energization of the synchronous motor as is illustrated in FIGURE 1a.

If at the instant $T_0$, by the actuation of the start-stop switch 8, a negative voltage is fed to the base electrode of the transistor 47, the transistor 47 becomes conductive. A negative voltage is produced at the junction of the resistors 48, 49, included in the emitter circuit of the transistor 47. This voltage blocks the rectifier 50, so that transistor 37 of the astable relaxation generator 37, 38 is no longer blocked. The relaxation generator 37, 38 is then allowed to oscillate freely. Thus the relaxation generator directly switches to the state in which the transistor 37 is conductive and the transistor 38 is blocked. The relaxation capacitor 44 which was previously charged up to the supply voltage now discharges via the conductive transistor 37 at a rate which is mainly determined by the time constant of the relaxation capacitor 44 and the relaxation resistor 42, until the voltage at the base electrode of the transistor 38 becomes sufficiently negative so that the transistor 38 becomes conductive. The relaxation generator thus returns to its initial state in which the transistor 37 is blocked and the transistor 38 is conductive. In this state the relaxation capacitor 43 discharges through the transistor 38. At the instant when the voltage at the base electrode of the transistor 37 has become sufficiently negative, transistor 37 once again conducts current. The astable relaxation generator 37, 38 switches back to the state in which the transistor 37 is conductive and the transistor 38 is blocked, after which the aforesaid cycle is repeated.

It is thus ensured that the application of a negative voltage to the base electrode of the transistor 47 causes the astable relaxation generator 37, 38 to oscillate freely. Each time transistor 37 becomes conductive, a positive control pulse is supplied via the rectifier 45, connected as a limiter, to the control-voltage conductor 31. Each pulse causes the rotor 3 of the synchronous motor to move over a fixed distance. When by the actuation of the start-stop switch 8 the base electrode of the transistor 47 obtains a positive voltage, the base electrode of the transistor 37 will also receive a positive voltage via the series-connected rectifier 50. Therefore, the astable relaxation generator 37, 38 will stop oscillating and the synchronous motor is locked in its last position by the resultant magnetization of the stator poles.

Since the distance covered by the rotor 3 of the synchronous motor is determined only by the number of control-voltage pulses and not by the repetition frequency of the control-voltage pulses, i.e. not by the speed of rotation of the synchronous motor, the device shown is particularly flexible in its uses. Particularly, by a suitable choice of the time constants of the relaxation circuits of the astable relaxation generator 37, 38, the speed of rotation of the synchronous motor may be varied within a fairly large range. The speed of rotation may, for example, be varied between 0 and 250 revolutions a minute.

With a high speed of rotation of the synchronous motor care should only be taken that the rotor 3 of the synchronous motor has the desired speed already at the first control-pulse. This is achieved by providing a longer duration for the first control-pulse than for the subsequent control-pulses. This is obtained in a simple manner by making the discharging time constant of the capacitor 44, included in the collector circuit of the transistor 37 greater than the discharging time constant of the capacitor 43, included in the collector circuit of the transistor 38. If at the instant $T_0$ the start-stop switch 8 is actuated, so that the transistor 37 becomes conductive and the transistor 38 is blocked, the duration of the first control-pulse will be determined by the time required by the relaxation capacitor 44, charged to the full supply voltage to discharge via the resistor 42 to approximately earth potential. The duration of the subsequent control-pulses is considerably shorter, since the capacitor 44 is no longer allowed to charge via the resistor 40 to the full supply voltage. The capacitor 44 can be charged via the resistor 40 only during the time determined by the duration in which the transistor 37 is blocked and the transistor 38 is conductive, which period is therefore determined by the discharge time constant of the capacitor 43 and the resistor 41. As stated above, this time constant is considerably smaller than that of the relaxation circuit 40, 44. The time constant of the capacitor 43 and the resistor 41 may, for example, be 3 msec. and the time constant of the capacitor 44 and the resistor 40 may be 9 msec. In this case the capacitor 44 is allowed to charge to not more than about one third of the supply voltage. By way of illustration FIGURE 2 shows above the control-voltage conductor 31 the sequence of control-pulses produced.

The device described above has the important advantage that the tolerances of the circuit components are not critical. In addition, by using the property of this device that the triggers 81 and 82 occupy the initial positions every four control-pulses of the control-voltage generator, very great tolerances in the proportioning of the control-voltage generator are permitted. When this device is used for driving the writing tape of telegraphy apparatus, it is particularly desirable that the writing tape be driven through a distance which corresponds to eight steps of the synchronous motor each time the control-switch 8 is depressed.

To this end it is only necessary to connect one output circuit of each of the bistable trigger circuits 81 and 82 to the base electrode of the transistor 47 via feedback conductors 53 and 54 respectively, which conductors include rectifiers 55 and 56 respectively. Furthermore a rectifier 51 is serially connected between monostable relaxation generator 52 and transistor 47. Rectifiers 51, 55, 56 together constitute a gate circuit. When a release pulse from the monostable relaxation generator 52 is lacking, the transistor 47 is held in the conductive state by the negative voltages supplied to its base electrode via the feedback conductors 53, 54 and originating from the collector circuits of the transistors 10 and 11. Until both of these transistors are again conductive and the rectifiers 55, 56 associated with the gate circuit are both blocked, which occurs once every four control-pulses, transistor 47 remains conductive. If, as mentioned above, it is desired to drive the synchronous motor through eight steps, the duration of the release pulse supplied by the monostable relaxation generator 52 need lie only within the time required for producing five to eight control-pulses. In spite of these very wide tolerances, which are easily obtained in the design of the control-voltage generator, it is nevertheless ensured that the rotor of the synchronous motor accurately moves through a distance corresponding to eight steps each time the start-stop switch 8 is actuated.

There are thus obtained not only an accurate angular rotation of the rotor shaft and a great flexibility in uses, but the requirements to be met in the proportioning of the device are easily met. All this renders the device described particularly attractive for practical use.

Figure 3:
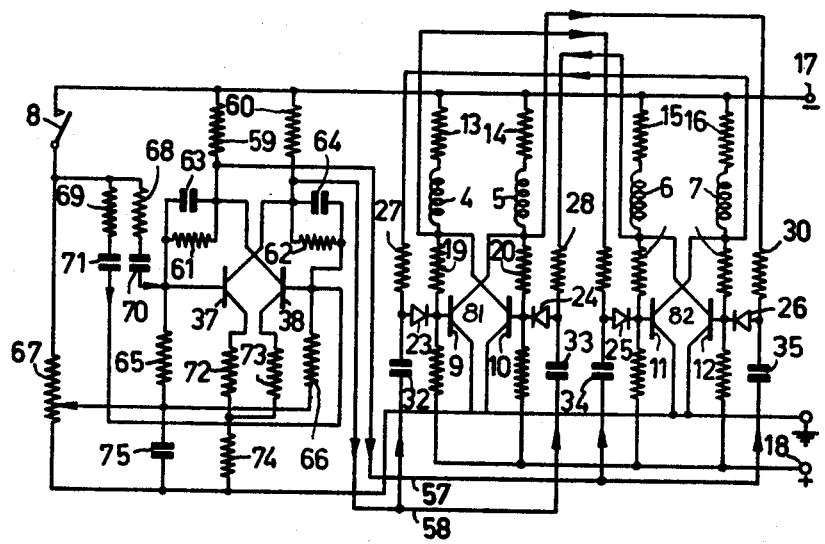

FIGURE 3 shows a simplified variant of the device shown in FIGURE 2 differing mainly in the control of the bistable triggers 81 and 82. Corresponding elements are designated by the same reference numerals.

In this embodiment the two bistable triggers 81 and 82 are identical to the two bistable triggers 81 and 82 of the device shown in FIGURE 2. The control-voltage generator also comprises an astable relaxation generator, controlled by the start-stop switch 8 and comprising two relatively blocking transistors 37, 38.

Instead of supplying, as in the device shown in FIGURE 2, the control-pulses via a single control-voltage conductor in parallel connection via gate circuits to the base electrodes of the bistable triggers 81 and 82, each of the collector circuits of the astable relaxation generator 37, 38 includes a control-voltage conductor 57 and 58 respectively. The control-voltage conductor 57 is connected via gate circuits 25 and 26 respectively to the base electrodes of the transistors 11 and 12 respectively, whereas the control-voltage conductor 58 is connected via gate circuits 23 and 24 respectively to the base electrodes of the transistors 9 and 10 respectively.

On the two control-voltage conductors 57 and 58 control-pulses occur alternately, whilst in the manner described with reference to FIGURE 2 the bistable triggers 81 and 82 are excited, so that the rotor 3 of the synchronous motor is moved through a distance of one rotor pole at each control-pulse.

In the embodiment shown each of the collector circuits of the transistors 37, 38, connected as a relaxation generator, is connected to the base electrode of the other transistor 38 or 37 respectively via a relaxation circuit, formed by a resistor 59, 60 and a capacitor 63, 64, shunted by a resistor 61, 62. The base electrodes of the transistors 37, 38 are also connected via resistors 65, 76 to a voltage divider 67, which is connected via the start-stop switch 8 between the negative voltage terminal 17 and earth and on the other hand via the series combination of a resistor 68, 69 and a capacitor 70, 71 respectively to the conductor of the voltage divider 67. The emitter circuit of each of the transistors 37, 38 includes a resistor 72 and 73 respectively, connected to earth via a common resistor 74.

If in the embodiment so far described the start-stop switch 8 is closed, the astable relaxation generator 37, 38 will oscillate freely, so that alternately a control-pulse is fed to the control-voltage conductors 57, 58, which pulse, as stated above, alternately drive the bistable triggers 81 and 82 respectively.

When the start-stop switch 8 is opened, the two resistors 65, 66 in the base electrode circuits of the transistors 37, 38 are connected to earth via the voltage divider 67, so that the voltage across the base electrodes of the transistors 37, 38 will vary in a positive sense. As a result the astable relaxation generator 37, 38 stops oscillating and is stabilized in its last position, for example in the position in which the transistor 37 is conductive and the transistor 38 is blocked. When the start-stop switch 8 is again closed, the relaxation generator will change over owing to a negative voltage pulse occurring via the circuit 68, 70 and 69, 71 respectively at each of the base electrodes of the transistors. This means that the transistor 38 draws current and the transistor 37 is blocked, so that the regular alternation of the occurrence of the control-pulses between the two control-voltage conductors 57, 58 is maintained in spite of the actuation of the start-stop switch 8 and hence also the regular order of succession of excitation of the bistable triggers 81 and 82.

As in the device shown in FIGURE 2, provisions are taken that in this device, when the start-stop switch 8 is closed, the first control-pulse has a longer duration than the subsequent control-pulses of the sequence. In this device this is achieved in a simple manner by connecting a capacitor 75 in parallel with the voltage divider 67. Thus the voltage at the base electrodes of the transistors 37, 38 will not directly assume the negative value associated with the voltage divider 67, but grow gradually to this value within a duration determined by the time constant of the circuit 67, 75. As a result the first control-pulse produced after the switch 8 has been closed, has a longer duration. In the device shown, in which the time constant of the relaxation circuits 59, 61, 63 and 60, 62, 64 amount to 5 msec., the time constant of the said circuit 67, 75 may be for example three times the said value, i.e. 15 msec.

It should be noted that in the devices described the direction of rotation of the synchronous motor can be reversed in a simple manner, for example, by interchanging two excitation windings 4 and 5 or 6 and 7 respectively in the output circuits of the bistable triggers 81 and 82 respectively. Alternatively, the reversal of rotation can be achieved by changing the order of excitation of the bistable triggers 81 and 82 respectively. This may be achieved by interchanging the connections of the gate circuits 23, 24, 25, 26 with the output circuits of the bistable triggers 81 and 82 respectively. This interchange may be carried out by means of switches or electromechanical relays, but it is also possible to carry it out by electronic means.

It is obvious of course that the amplifying elements comprising the transistors may be composed of amplifying tubes in the devices described above.

What is claimed is:

1. Apparatus for operating a motor having first and second stator windings each of which is adapted to be supplied by an energizing voltage, each of said stator windings comprising first and second winding elements, said apparatus comprising first and second bistable trigger circuits each of which has an input circuit and first and second output connections, said output connections of said first trigger circuit being individually connected to the winding elements of said first stator winding and the output connections of said second trigger circuit being individually connected to the winding elements of said second stator winding for supplying out of phase bivalued energizing voltages thereto, means for generating control pulses for selectively switching said bistable trigger circuits in a predetermined order and including an output circuit, first and second gate circuit means having an open and closed condition and interconnecting the output circuit of said pulse generating means with the input circuit of said first and second trigger circuits, respectively, said first gate circuit being further connected to an output connection of said second trigger circuit and said second gate circuit being further connected to an output connection of said first trigger circuit, the state of said first and second bistable trigger circuits determining the condition of said first and second gate circuit means, said gate circuits and said bistable trigger circuits coacting so that successive control pulses produced will alternately switch said first and second bistable trigger circuits, and switch means for actuating said pulse generating means to produce said control pulses.

2. Apparatus according to claim 1 wherein said gate circuits and said bistable trigger circuits are interconnected so that only one trigger circuit can be switched by any one control pulse.

3. Apparatus for stepping the rotor of a motor a predetermined number of steps in response to an actuating signal, which motor includes a plurality of energizing windings each of which is adapted to be supplied by a bivalued input signal, said apparatus comprising first and second bistable trigger elements each of which has an input circuit and a plurality of output terminals, each of said output terminals being individually connected to a different one of said energizing windings for supplying out of phase bivalued signal voltages thereto, means for generating control pulses for selectively switching said bistable trigger elements in a predetermined sequence, said pulse generating means comprising an astable relaxation generator having input and output circuit means, first and second gate circuit means having an open and closed condition connected between said pulse generator output circuit means and the input circuits of said first and second trigger elements, respectively, said first and second gate circuit means being interconnected with said first and second bistable trigger elements so that the condition of each of said first and second gate circuits is determined by the state of said first and second bistable trigger elements whereby successive control pulses will alternately switch said first and second trigger elements, switch means for actuating said pulse generating means to produce said control pulses, and third gate circuit means interconnecting one output terminal of each of said first and second bistable trigger elements with the input circuit means of said relaxation generator so that said relaxation generator is blocked after producing a predetermined number of control pulses.

4. Apparatus for operating a motor having a plurality of energizing windings each of which is adapted to be supplied by a bivalued input signal, comprising first and second bistable trigger circuits each of which has an input circuit and a plurality of output terminals, each of said output terminals being individually connected to a different one of said energizing windings for supplying out of phase bivalued signal voltages thereto, means for generating a series of control pulses for selectively switching said bistable trigger circuits in a predetermined sequence, switch means for actuating said pulse generating means, said pulse generating means comprising an astable relaxation generator having an output circuit and timing circuit means for producing a first pulse of longer duration than the following pulses produced upon actuation of said pulse generating means by said switch means, first and second gate circuit means having an open and closed condition and connected between said relaxation generator output circuit and the input circuits of said first and second trigger circuits, respectively, said first and second gate circuit means being interconnected with said first and second bistable trigger circuits so that the condition of each of said first and second gate circuit means is determined by the state of said first and second bistable trigger circuits whereby successive control pulses will alternately switch said first and second trigger circuits.

5. Apparatus for supplying periodic unidirectional bivalued energizing currents to the stator windings of synchronous motor of the kind comprising first and second stator windings each of which comprise first and second winding elements, said apparatus comprising first and second bistable trigger elements each having input circuit means and first and second output terminals, said first and second output terminals of said first trigger element being individually connected to said first and second winding elements of said first stator winding and said first and second output terminals of said second trigger being individually connected to said first and second winding elements of said second stator winding, means for generating control pulses for selectively switching said bistable trigger elements in a predetermined sequence and including output circuit means, first and second gate circuit means having an open and closed condition connected between said output circuit means of said pulse generating means and said input circuit means of said first and second trigger elements, respectively, said first and second gate circuit means being interconnected with said first and second trigger elements so that the condition of each of said first and second gate means is determined by the state of said first and second trigger elements so that successive control pulses will be directed to alternately switch said first and second trigger elements, said switching sequence providing first and second energizing currents from said first trigger element 180 degrees out of phase with each other and first and second energizing currents from said second trigger element 180 degrees out of phase with each other, said energizing currents of said first trigger element also being 90 degrees out of phase with each of the energizing currents of said second trigger element, and vice versa, and switch means for actuating said pulse generating means.

6. Apparatus according to claim 5, wherein said first bistable trigger element comprises first and second amplifying devices each having an input and output electrode and said second bistable trigger element comprises third and fourth amplifying devices each having an input and an output electrode, and wherein said first gate circuit means comprises first and second diodes and said second gate circuit means comprises third and fourth diodes, said first diode being interconnected in circuit between the input electrode of said first amplifying device and the output electrode of said third amplifying device, said second diode being interconnected in circuit between the input electrode of said second amplifying device and the output electrode of said fourth amplifying device, said third diode being interconnected in circuit between the input electrode of said third amplifying device and the output electrode of said second amplifying device, and said fourth diode being interconnected in circuit between the input electrode of said fourth amplifying device and the output electrode of said first amplifying device.

7. Apparatus according to claim 5 wherein said pulse generating means comprises an astable relaxation generator having input circuit means and further comprising third gate circuit means comprising first and second diodes, said first diode being connected in circuit between one output terminal of said first trigger element and said input circuit means of said relaxation generator and said second diode being connected in circuit between one output terminal of said second trigger element and said relaxation generator input circuit means so that said relaxation generator is rendered inoperative after producing a predetermined number of control pulses.

8. Apparatus for stepping the rotor of a synchronous motor a predetermined number of steps in response to a start signal comprising first and second bistable trigger elements each having input circuit means and first and second output circuit means for supplying stepping current pulses to individual stator windings of said motor, pulse generating means for producing control pulses for selectively switching said trigger elements in a predetermined sequence, and said pulse generating means comprising an astable relaxation generator having input and output circuit means, switch means for actuating said pulse generating means and including means for producing an actuating pulse of a first predetermined time period, first and second gate circuit means connected between said relaxation generator output circuit means and the input circuit means of said first and second trigger elements, respectively, said first and second gate circuit means being interconnected with said first and second trigger elements so that the condition of each of said first and second gate circuits is determined by the state of said first and second trigger elements whereby successive control pulses will alternately switch said first and second trigger elements through a cycle having a second predetermined time period, and third gate circuit means interconnecting said switch means and one of said first and second output circuit means of each of said first and second trigger elements with said relaxation generator input circuit means so that said relaxation generator is blocked after producing a predetermined number of control pulses.

9. Apparatus as described in claim 8 wherein said first predetermined time period is greater than said second predetermined time period.

10. Apparatus for operating a multiphase motor having a plurality of energizing windings each of which is adapted to be supplied by an alternating voltage input signal, comprising a plurality of bistable trigger elements one for each phase of said multiphase motor, each of said trigger elements having an input circuit and output circuit means connected to a different one of said energizing windings for supplying out of phase alternating signal voltages thereto, means for generating control pulses for selectively switching said bistable elements in a given sequence and including output circuit means, a plurality of gate circuit means each of which is individually associated with a different one of said bistable trigger elements, means for connecting each of said gate circuit means between said output circuit means of said pulse generating means and the input circuit of its associated bistable element, each of said gate circuit means being interconnected with the output circuit means of a predetermined one of said bistable trigger elements so that the condition of any one of said gate circuit means is determined by the state of another one of said bistable trigger elements, and switch means for actuating said pulse generating means to produce a series of pulses for sequentially switching said plurality of bistable trigger elements in a predetermined order, said switch means determining the time period during which said control pulses are produced.

11. Apparatus as described in claim 10 wherein said control pulse generating means comprises an astable relaxation generator and further including means for supplying a bias voltage to said astable generator for controlling the condition thereof in response to the actuation of said switch means.

12. Apparatus as described in claim 11 wherein said astable relaxation generator includes input circuit means, said apparatus further comprising second gate circuit means interconnecting said output circuit means of each of said trigger elements with the input circuit means of said relaxation generator whereby said relaxation generator is blocked after producing a predetermined number of control pulses.

13. Apparatus as described in claim 11 wherein said relaxation generator further comprises timing circuit means including the combination of a resistance element and a capacitance element, said timing circuit means controlling the operation of said astable generator so that a first pulse is produced of longer duration than the following pulses produced upon actuation of said astable generator by said switch means.

References Cited in the file of this patent

UNITED STATES PATENTS

| | | |
|---|---|---|
| 2,922,095 | Hesse et al. | Jan. 19, 1960 |
| 2,953,735 | Schmidt | Sept. 20, 1960 |
| 2,994,813 | Towner | Aug. 1, 1961 |
| 3,025,433 | Wilkinson et al. | Mar. 13, 1962 |
| 3,042,847 | Welch | July 3, 1962 |
| 3,124,732 | Dupy | Mar. 10, 1964 |